United States Patent [19]

Standish, Jr.

[11] Patent Number: 5,050,334
[45] Date of Patent: Sep. 24, 1991

[54] AUDIBLE FISHING LURE

[76] Inventor: Calvin G. Standish, Jr., Rte. 1, Box 119, Pequot Lakes, Minn. 56472

[21] Appl. No.: 612,749

[22] Filed: May 21, 1984

[51] Int. Cl.⁵ ........................................... H01K 85/00
[52] U.S. Cl. .................................. 43/42.13; 43/42.2; 43/42.31
[58] Field of Search ................. 43/42.11, 42.13, 42.14, 43/42.17, 42.18, 42.19, 42.2, 42.26, 42.28, 42.31, 42.52

[56] References Cited

U.S. PATENT DOCUMENTS

| | | | |
|---|---|---|---|
| 1,731,161 | 10/1929 | Farley | 43/42.13 |
| 1,787,726 | 1/1931 | Heddon | 43/42.13 |
| 1,830,080 | 11/1931 | Allen | 43/42.31 |
| 1,842,127 | 1/1932 | Stickel et al. | 43/42.12 |
| 2,167,945 | 8/1939 | Gilliam | 43/42.13 |
| 2,374,279 | 4/1945 | Fugler | 43/42.13 |
| 2,526,077 | 10/1950 | Jurczak | 43/42.12 |
| 2,926,451 | 3/1960 | Leba | 43/42.14 |
| 3,112,576 | 12/1963 | Tay | 43/42.14 |
| 3,397,478 | 8/1968 | Lowes, Jr. | 43/42.14 |
| 3,546,804 | 12/1970 | Woolums | 43/42.11 |
| 4,033,065 | 7/1977 | Shannon | 47/42.11 |
| 4,201,008 | 5/1980 | Sparkman | 43/43.13 |
| 4,468,881 | 9/1984 | Gordon | 43/42.28 |
| 4,510,710 | 4/1985 | Hanna | 43/42.14 |

Primary Examiner—Richard K. Seidel
Attorney, Agent, or Firm—Burd, Bartz & Gutenkauf

[57] ABSTRACT

A sound producing fishing lure having an elongated body secured to a hook and a pair of bendable arms. Rod members attached to the arms rotatably support spinners that intermittently hit each other to produce fish attracting sounds. The arms are bendable to change the relative lateral positions of the spinners thereby change the sounds producing characteristics of the lure.

14 Claims, 1 Drawing Sheet

AUDIBLE FISHING LURE

FIELD OF THE INVENTION

The invention is directed to an artificial fishing lure that attracts fish by motion and sound as it is drawn through the water.

BACKGROUND OF INVENTION

Fish have a lateral line running along each side of their bodies. Each line is a small canal extended along the length of a side of the fish. The canal is filled with a thick liquid. Numerous pores along the length of the canal are open to the outside in the skin or between the fish scales. Nerve endings joined to the canal are part of the nervous system of the fish. The lateral lines allow the fish to monitor information about its surroundings. The fish senses the changes in current, temperature and direction of the water flow. The lateral lines also function to monitor balance and operate as a sonar system. As the fish swims it produces motion that sends out vibrations that are reflected off of objects. The reflected vibrations or signals are picked up by the sensitive lateral lines. The nerve endings sense the signals picked up by the lateral lines and transmit the signals to the nervous and control/command systems of the fish. It has been observed that fish respond to sound by swimming to the source of the sound vibrations.

A fishing lure that utilizes sound to attract fish is described by Lowes in U.S. Pat. No. 3,397,478. The Lowes fishing device produces pulse vibrations as it is drawn through the water. These vibrations are produced by a pair of bladed rotatable members mounted on a single shaft. A helical cam interposed between the rotatable members causes forward and reverse movements of one rotatable member to produce intermittent sounds.

An audible fishing lure for producing chirping and clicking sounds to attract fish disclosed by Tay in U.S. Pat. No. 3,112,576. The Tay lure has a pair of oppositely pitched spinners rotatably mounted on a single rigid shaft attached to a fish line. The spinners strike each other during their rotation to produce clicking sounds.

SUMMARY OF INVENTION

The invention relates to a fishing lure that produces sound signals or vibrations as it is retrieved in the water. The lure has body means having a forward eye adapted to accommodate a fish line or leader connected to a conventional fishing tackle. A hook is joined to the rear of the body means. A pair of bendable arms are attached to the forward end of the body means. The arms extend upwardly and outwardly from the body means. Rod members joined to the outer ends of the arms extend generally parallel to the body means. Rotatable spinners are mounted on the rod members. The spinners rotate in opposite directions and have portions that hit each other on rotation of the spinners which generates fish attracting intermittent sounds. A first weight is mounted on the body means adjacent to hook means. A flexible skirt surrounds the hook means adjacent the first weight means to provide a camoflage for the weight means and the hook. The skirt has a plurality of flexible bands surrounding the weight means and hook. A second weight means is joined to the body means adjacent the forward eye. The arms are connected to the second weight means. The arms are bendable elongated linear wire members. Each of the arms is selectively bendable toward or away from each other to alter the lateral space relationship between the spinners to change the sound generating characteristics of the rotating spinners.

Each of the spinners has a generally V-shaped body and oppositely turned ears located on opposite end portions of the body. The ears of the second spinner extend in directions opposite to the direction of extension of the corresponding ears in the first spinner whereby the first and second spinners turn in opposite rotational directions as the lure is moved forwardly in the water. The rotating spinners contact each other and produce clicking sounds and motion that attracts fish.

DETAILED DESCRIPTION OF INVENTION

Figure 1:
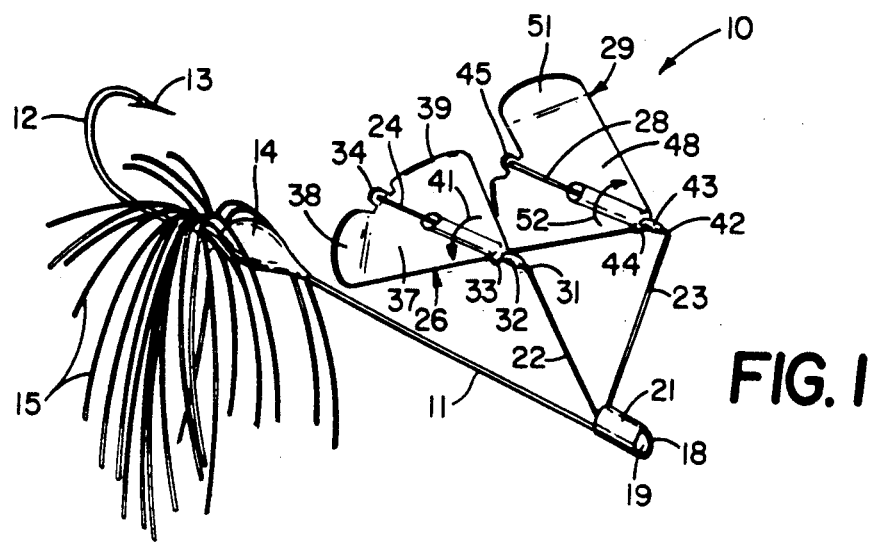
FIG. 1 is a perspective view of the audible fishing lure of the invention.
Figure 2:
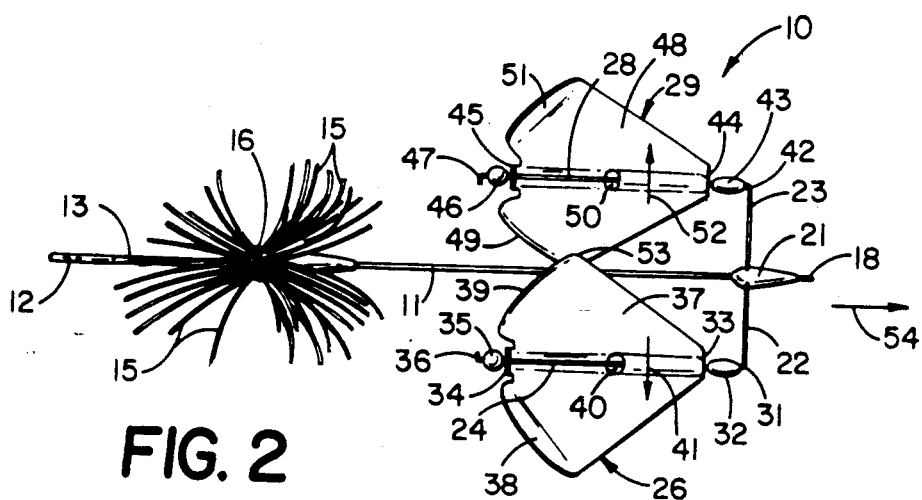
FIG. 2 is a top view of the lure of FIG. 1.
Figure 3:
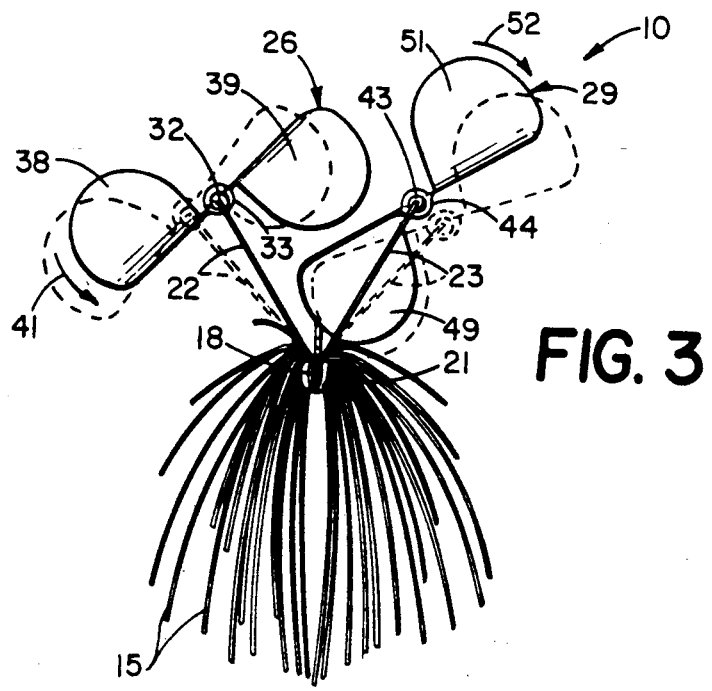
FIG. 3 is a front elevational view of the lure of FIG. 1.

Referring to FIGS. 1 to 3, there is shown the audible fishing lure of the invention indicated generally at 10. Lure 10 has an elongated linear body 11 normally extended in generally horizontal direction. Body 11 is an elongated wire or rod having a rear end attached to a hook 12. Hook 12 extends in an upward direction and terminates in a forwardly projected barb 13. Hook 12 is normally located in the vertical plane of body 11. A first sinker or weight 14 surrounds the rear of body 11 and the shank of hook 12. Hook 12 is connected to the rear end of body 11. Weight 14 is a molded lead body located around the connection of the hook 12 to body 11. Weight 14 has a general conical or tear-drop shape which tapers in a rearward direction toward hook 12.

A flexible camoflage skirt 15 is mounted on hook 12 adjacent weight 14. As shown in FIG. 2, a cord or band 16 wrapped around the mid-portion of skirt 15 retains the skirt on the hook 12 adjacent weight 14. Skirt 15 comprises a plurality of flexible members or bands that project from opposite sides of cord 16 to provide camoflage for hook 12 and weight 14. The flexible members are elongated plastic or rubber bands. The bands can have one or more colors, such as red and white, black and white, and the like.

The forward end of body 11 is an upwardly turned loop 18 forming an eye 19. A line or a leader (not shown) can be attached to loop 18 whereby the lure 10 is pulled in the forward direction by conventional fishing tackle. A second sinker, weight or head 21 is mounted on the forward end of body 11 adjacent loop 18. Head 21 is a general cone-shaped weight, such as a lead body molded on the body 11 and upper end of loop 18.

Extended upwardly from head 21 are a pair of bendable linear arms 22 and 23. Arms 22 and 23 are wires extended upwardly in opposite outward directions from head 21. The angle between arms 22 and 23 is less than 90 degrees. This angle can be changed by bending the arms toward or away from each other. The lower ends of arms 22 and 23 are anchored to head 21. Head 21 is a rigid connector for arms 22 and 23. Arm 22 has a first linear rod end 24 rotatably supporting a first spinner indicated generally at 26. Arm 23 has a second rod end 28 rotatably supporting a second spinner indicated generally at 29. Rod ends 24 and 28 are linear wires extended generally parallel to each other and parallel to body 11.

The upper end of arm 22 has a right angle corner 31 joined to the forward end of rod 24. A cylindrical bead 32 spaces spinner 26 from corner 31. Spinner 26 has a pair of end tabs 33 and 34 having holes accommodating rod 24. The rear end of rod 24 supports a bead 35. A right angle finger 36 of rod 24 retains bead 35 and spinner 26 in rotating relationship on rod 24. Spinner 26 has a generally flat V-shaped body 37 with a central hole 40 and a pair of curved blades or ears 38 and 39 located on the opposite rear edges of body 37. Body 37 has rearwardly diverging linear side edges. Blades 38 and 39 each have generally U-shaped outer edges that merge with the linear side edges of body 37. Rod 24 extends through hole 40. Blades 38 and 39 project in opposite directions and cause a rotation of spinner 26 in a counter-clockwise direction as indicated by the arrow 41 when the lure is pulled in the forward direction.

Second arm 23 has an outer right angle corner 42 joined to the forward end of rod 28. A bead 43 rotatably mounted on rod 28 spaces spinner 29 from corner 42. Spinner 29 has a pair of tabs 44 and 45 containing aligned holes for accommodating rod 28. The rear end of rod 28 rotatably supports a spherical bead 45. A turned finger 47 on the end of rod 28 maintains bead 45 and spinner 29 in rotating assembled relation on rod 28. Spinner 29 has a V-shaped body 48 with a central hole 50 and rear end blades or ears 49 and 51 projected in opposite directions. Spinner 29 has the same size and shape as spinner 26 except that blades 49 and 51 extend in opposite directions from corresponding blades 38 and 39 whereby spinner 29 rotates in a clockwise direction as indicated by arrow 52. Rod 28 extends through hole 50. An example of lure 10 has the following dimensions. The body 11 is a linear stiff wire having a length of 6 cm. Weight 14 surrounds one end of the wire and adjacent end of hook 12. Hook 12 is turned upwardly with the point projected in the forward direction. Body 11 and hook 12 are located in the same vertical plane direction. Skirt 15 comprises a plurality of flexible plastic strings having a length of 8 cm. The strings are disposed around weight 14 and retained on the hook shank with plastic cord 16. Arms 22 and 23 are linear bendable wires that project upwardly. The angle between the arms 22 and 23 is less than 90 degrees. Each arm has a length of 3 cm. Each rod end 24 and 28 has a length of 4 cm. and extends rearwardly generally parallel to body 11. The beads 32 and 33 rotatably mounted on ends 24 and 28 have elongated general oval shapes and length of 5 cm. Spinners 26 and 29 are one-piece sheet metal members rotatably mounted on ends 24 and 28. Spinners 26 and 29 can be made of sheet aluminum. An example of a suitable rotatable spinner is disclosed by Sparkman in U.S. Pat. No. 4,201,008.

In use, spinners 26 and 27 rotate in opposite directions as indicated by arrows 41 and 52 as the lure is moved in a forward direction as indicated by arrow 54. The rotating spinners 26 and 29 intermittently contact or hit each other thereby produce sounds and motion. Outer portions 53 of spinners 26 and 29, as shown in FIG. 2, hit each other and thereby produce sounds or vibrations. The vibrations are transmitted through the water. Fish in the vicinity of the lure will sense the sound vibrations and make an inquisitive investigation.

The sound producing characteristics of lure 10 can be altered by the fisherman. As shown in FIG. 3, arms 22 and 23 can be bent in opposite outward directions as indicated by the broken lines. This laterally spaces spinners 26 and 29 from each other so only outer edges of the ears 38, 39 and 49, 51 will intermittently engage each other as the spinners 26 and 29 rotate in opposite directions as indicated by arrows 41 and 52. This changes the sound vibration intensity and frequency of lure 10 as it is drawn through the water. The fisherman, with the use of intermittent retrieval can further alter the sound generating characteristics of the lure to attract fish. Alternations in the retrieval speed of lure 10 also causes changes in the sound signals caused by the rotating spinners 26 and 29.

While there has been shown and described a preferred embodiment of the audible fishing lure of the invention, it is understood that changes in any shape, materials, and size of the lure can be made by those skilled in the art without departing from the invention. The invention is defined in the following claims.

The embodiments of the invention in which an exclusive property or privilege is claimed are defined as follows:

1. An audible fishing lure comprising: body means having an elongated linear member having a first end and a second end, hook means connected to the second end of the body means, first weight means mounted on the body means adjacent the hook means, pair of arms attached to the first end of the body means, each of said arms comprising elongated linear arm members having outer ends, said arm members diverging from each other from the first end of the body means and located in a transverse plane generally normal to the elongated linear member, second weight means securing the arm members to the first end of the body means, loop means projected forwardly from said second weight means providing an eye to accommodate a fish line, a pair of generally parallel rod members joined to the outer ends of the arm members, said rod members being shorter than the elongated linear member of the body means and extended generally parallel to the linear member of the body means, and spinner means rotatably mounted on each rod member, said spinner means comprising a pair of spinners, each spinner having a body and oppositely turned ears on opposite end portions of the body, said ears of one spinner being extended in the opposite direction as the ears in the other spinner whereby the spinners rotate in opposite directions as the lure is moved forwardly in the water, said spinner means having portions that contact each other on rotation of the spinner means thereby providing fish attracting intermittent sounds.

2. The fishing lure of claim 1 wherein: the pair of arms are bendable elongated linear members, each of said arms being bendable to alter the lateral space relationship between the spinner means to change the sound generating characteristics of the rotating spinner means.

3. The fishing lure of claim 1 including: flexible skirt means mounted on said hook means adjacent said first weight means.

4. The fishing lure of claim 3 wherein: said flexible skirt means comprises a plurality of elongated flexible bands, and means surrounding intermediate portions of the bands to mount the bands on said hook means.

5. The fishing lure of claim 1 wherein: said body of each spinner has linear side edges that diverge rearwardly, and each of said ears have a generally U-shaped outer edge.

6. The fishing lure of claim 5 wherein: the pair of arms are bendable elongated linear members, each of said arms being bendable to alter the lateral space relationship between the spinners to change the sound generating characteristics of the rotating spinners.

7. An audible fishing lure comprising: an elongated linear body having a first end and a second end, hook means connected to the first end of the body, a loop having an eye connected to the second end of the body, first weight means mounted on the first end of the body, a first arm having a first end and a second end, second arm having a first end and a second end, said first and second arms extended generally normal to said linear body, second weight means connecting the first ends of the first and second arms to the second end of the body, a first rod connected to the second end of the first arm, a second rod connected to the second end of the second arm, said first and second rods extended generally parallel to the linear body, and being shorter than the linear body, first spinner means rotatably mounted on said first rod and second spinner means rotatably mounted on said second rod, said first and second spinner means each comprises a spinner having a generally V-shaped body and oppositely turned ears on opposite end portions of the body, said ears of one spinner being extended in opposite directions as the ears on the other spinner whereby the first and second spinner means rotate in opposite directions as the lure is moved forwardly in the water, said first and second spinner means having portions that contact each other on rotation of the spinner means thereby producing fish attracting intermittent sounds.

8. The fishing lure of claim 7 wherein: the first arm and second arm are bendable to alter the lateral space relationship between the spinner means to change the sound generating characteristics of the rotating spinner means.

9. The fishing lure of claim 7 including: flexible skirt means mounted on said hook means adjacent said first weight means.

10. The fishing lure of claim 9 wherein: said flexible skirt means comprises a plurality of elongated flexible bands, and means surrounding intermediate portions of the bands to mount the bands on said hook means.

11. The fishing lure of claim 7 wherein: said body of each spinner has linear side edges that diverge rearwardly, and each of said ears having a generally U-shaped outer edge.

12. The fishing lure of claim 11 wherein: said first and second arms are bendable elongated linear members, each of said arms being bendable to alter the lateral space relationship between the spinners to change the sound generating characteristics of the rotating spinners.

13. A fishing lure comprising: a shank having a rear end and a front end, barbed hook means connected to the rear end of the shank, eyelet means connected to the front end of the shank, a body with a skirt attached to the shank adjacent the hook means, a plurality of arms attached to the shank adjacent the eyelet means, said arms having rear portions extended generally toward the body from the eyelet means and spaced laterally apart from each other, and propeller means rotatably mounted on the rear portions of each arm, said propeller means being dimensioned so that when the propeller means turn in response to movement of the lure in the water, the propeller means strike each other only as a result of their rotation.

14. An audible fishing lure comprising: an elongated body having a first end and a second end, hook means connected to the first end of the body, a loop having an eye connected to the second end of the body, first weight means mounted on the first end of the body, a first arm having a first end and a second end, second arm having a first end and a second end, said first and second arms extended generally normal to said body, second weight means connecting the first ends of the first and second arms to the second end of the body, a first rod connected to the second end of the first arm, a second rod connected to the second end of the second arm, said first and second rods extended generally parallel to the body, and being shorter than the body, first spinner means rotatably mounted on said first rod, and second spinner means rotatably mounted on said second rod, said first and second spinner means each comprises a spinner having a generally V-shaped body and oppositely turned ears on opposite end portions of the V-shaped body, said first and second spinner means having portions that contact each other on rotation of the spinner means thereby producing fishing attracting intermittent sounds.

* * * * *